Dec. 4, 1956  W. E. REMINGTON  2,772,656
FILTER IMPREGNATION INJECTION MACHINE
Filed Dec. 23, 1952  3 Sheets-Sheet 2
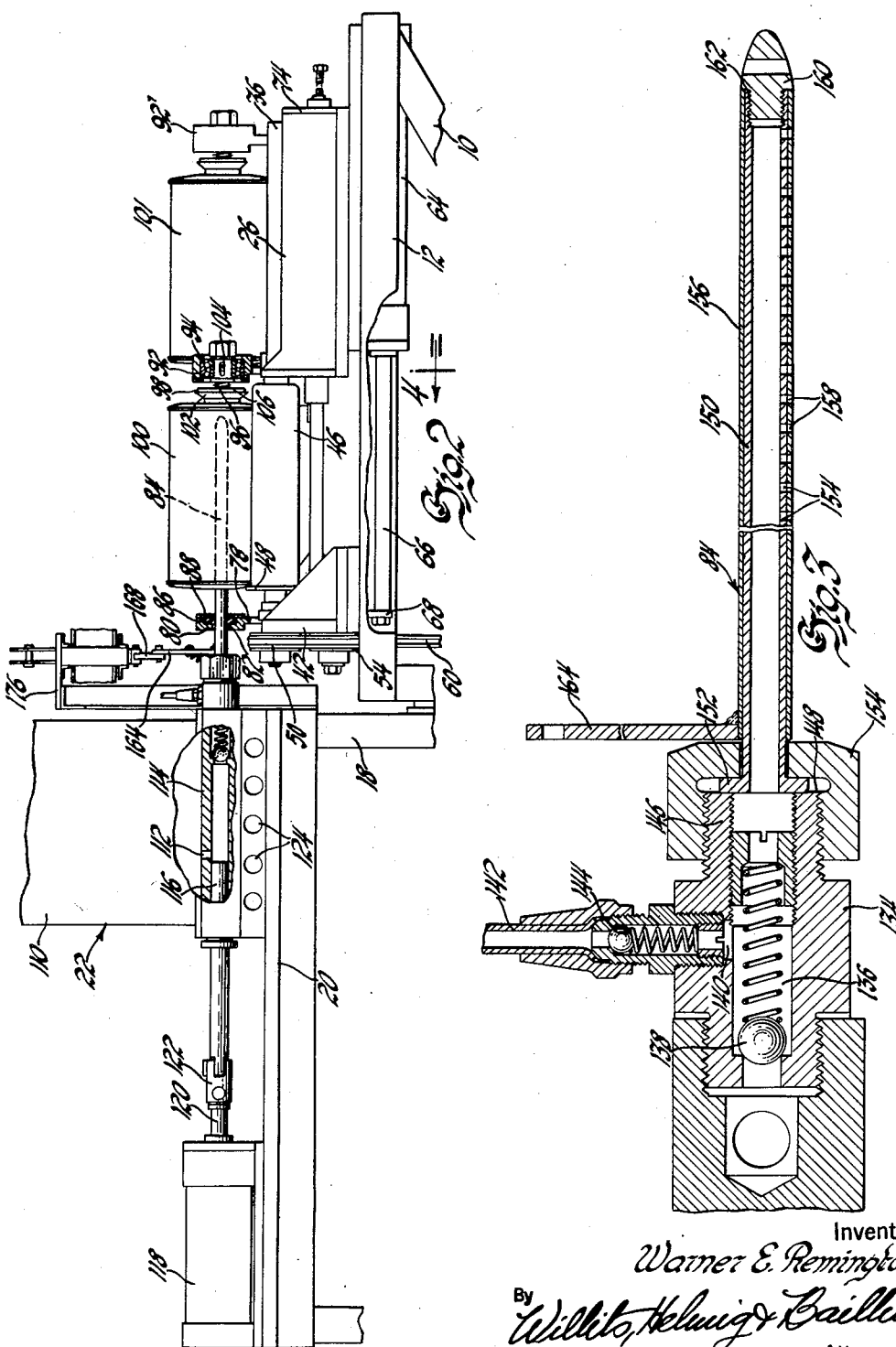

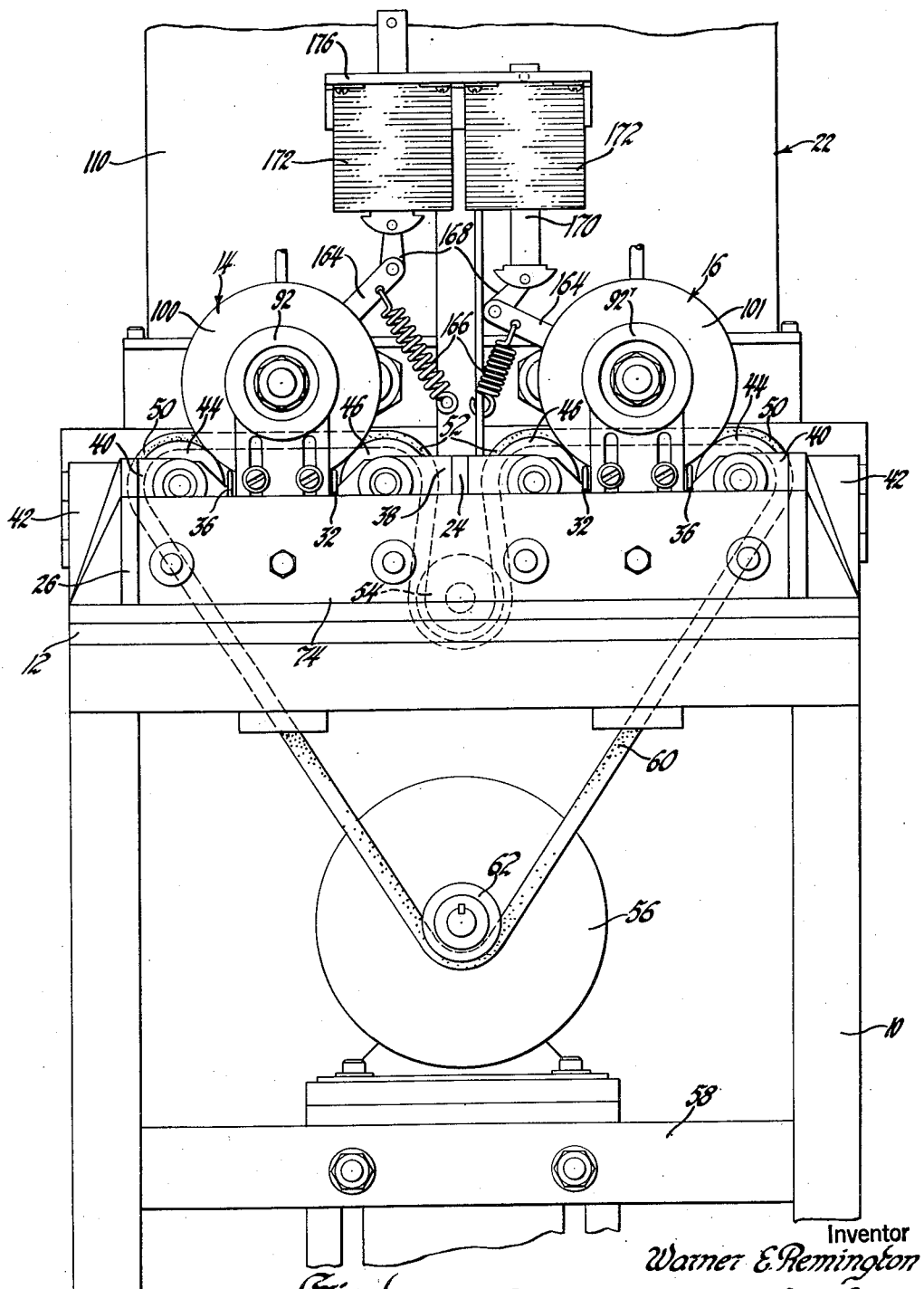

Dec. 4, 1956 W. E. REMINGTON 2,772,656
FILTER IMPREGNATION INJECTION MACHINE
Filed Dec. 23, 1952 3 Sheets-Sheet 3

Inventor
Warner E. Remington
By Willits, Helwig & Baillio
Attorneys

United States Patent Office 2,772,656
Patented Dec. 4, 1956

2,772,656

FILTER IMPREGNATION INJECTION MACHINE

Warner E. Remington, Davison, Mich., assignor to General Motors Corporation, Detroit, Mich., a corporation of Delaware Application December 23, 1952, Serial No. 327,642

3 Claims. (Cl. 118—302)

This invention relates to the impregnation of sheet material with a fluid and, more particularly, to apparatus for impregnating a generally cylindrical member with a fluid.

In the process of manufacturing cylindrical objects, it is often desirable to coat the internal surface of a generally cylindrical sheet material element with a fluid impregnating or treating compound. The invention is illustrated in connection with the manufacture of oil filters where it is desirable to impregnate or coat the oil filter paper after the filter manufacture has been completed to add a filter aid material to the oil filter paper. The filter aid fluid cannot be added before the filter is completed since it would evaporate or harden when the resin impregnated filter paper is cured in its final form or shape. Thus, the filter aid material or fluid must be applied to the filter paper after the filter paper has been cured in its final form in the filter assembly. These filter assemblies generally consist of a central perforated tube having end plates at each end and the paper filter element extending between the end plates having a pleated surface. The apparatus illustrated in the drawing shows a filter impregnating or coating machine for coating two filters sequentially. Thus, the operator can place one filter in the machine while the other is being coated. The operator places the filter element in the machine on parallel guides which automatically move the filter element inwardly over a nozzle and position the filter on a pair of rotating driving rollers. Then the rollers rotate the filter element at high speed and a predetermined quantity of fluid is injected through the nozzle to the inside of the filter. The rollers continue to rotate the filter at high speed to throw the fluid outwardly and distribute the fluid by centrifugal force to evenly coat the internal surface of the paper portion of the filter element.

The primary object of this invention is to provide a coating or impregnating machine to continuously rotate a generally cylindrical element while a specific quantity of fluid is injected inside the cylindrical element and to continue rotating the cylindrical element to evenly distribute the fluid about the internal surface of the generally cylindrical element.

Another object of the invention is to provide in an apparatus for coating the inside of a generally cylindrical element, a guide mechanism on which the operator places the cylindrical element and which will automatically move the cylindrical element onto a pair of rotating rollers to rotate the cylindrical element while it is being impregnated.

Another object of the invention is to provide in a coating apparatus, a cylindrical nozzle having an outer sheath to open and close a plurality of nozzle openings along the length of the cylindrical nozzle.

Another object of the invention is to provide in an apparatus for coating the internal surface of a generally cylindrical member, a nozzle having a row of nozzle openings along its length to coat the internal surface of the cylindrical element as it is rotated at high speed.

These and other objects of the invention will be more fully described in the accompanying specification and drawings which describe a preferred embodiment of the invention.

Figure 1 is a front elevation of the coating apparatus.

Figure 2 is a side elevation of the coating apparatus with parts in section to show details thereof.

Figure 3 is an enlarged detail of the nozzle and valve mechanism therefor.

Figure 4:
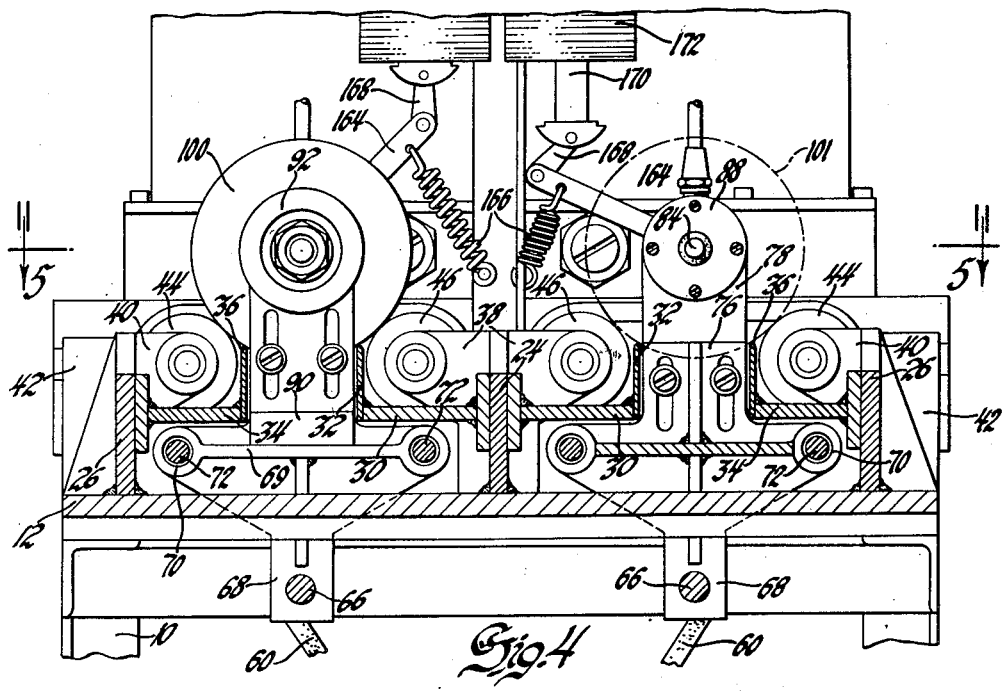
Figure 4 is a partial section along the line 4—4 of Figure 2.

The invention is illustrated in connection with apparatus for impregnating a paper filter surface of generally cylindrical oil filters. The filter paper surface is generally pleated either horizontally or vertically in these cylindrical filters. The filter element is placed in the machine on a pair of parallel guide members and moved by power means to place the cylindrical filter element on a pair of parallel rotating rolls to rotate the filter at high speed. While the filter is moved on the guide members, a fixed nozzle enters the central opening in the filter. The fluid nozzle which is within the center opening in the filter is opened to inject fluid inside the filter. After the fluid is injected, the filter continues to rotate and the fluid is distributed evenly over the filter paper surface by centrifugal force.

The apparatus is mounted on a support comprising a frame 10 having a table top 12. On the table top 12 there is mounted as best shown in Fig. 1 the mechanism providing a first impregnating station 14 at the left and a second impregnating station 16 at the right. Thus, while one impregnating station is in operation the operator can be removing a coated filter from the other station and inserting a new filter to be coated in the next operation. At the rear of the main table portion 12 there is an auxiliary support slightly higher than the main table supported on frame 18 and having an auxiliary top 20.

The fluid supply mechanism and the nozzle and its injector mechanism 22 is mounted on this support. Since the impregnating or coating stations are substantially the same, they are described together and similar parts are identified by the same reference numeral. The guide mechanism is mounted on a central vertical support 24 consisting of an elongated plate mounted vertically and extending longitudinally of the table and two side vertical supports 26 consisting of elongated plates mounted vertically at each side of the table. The supports 24 and 26 are parallel to each other and extend from the front to the center of table 12. A horizontal support plate 30 is welded to each side of the central vertical support 24. A vertical guide rail 32 is secured to the free edge of each of the horizontal supports 30 to provide the centrally positioned guide rail for each of the stations. A horizontal support plate 34 is secured to each of the outside vertical support plates 26 and extends toward but is spaced from the horizontal supports 30. The horizontal support plates 34 have welded thereto at their free edge a vertical outer rail 36. The top edges of adjacent pairs of parallel rails 36 and 32 are positioned in the same horizontal plane and uniformly spaced apart a suitable distance to support the cylindrical oil filter container and prevent it rolling off the guide rails. The guide rails terminate just short of the driving rolls 46. At the end of the central vertical support 24 adjacent the center of the table there is a pair of central bearing supports 38 each extending transversely in opposite directions from the central vertical support. The outside vertical support members 26 have located on their inner surface adjacent the center of the table transversely positioned bearing brackets 40 extending toward the center of each folding station. The bearing supports 38 and 40 have bearings positioned between the vertical support on which they are mounted and the rail mounted on the same side of that vertical support. At the rear of table top 12 there is a bearing support bracket 42 extending transversely and having a bearing aperture in alignment with each of the bearing apertures in bearing brackets 38 and 40. Each coating station has an outside roller 44 having a shaft rotatably mounted in the bearing in the outside bearing bracket 40 and in a bearing in alignment therewith in bearing bracket 42. The central rollers 46 of each station have shafts rotatably mounted in bearing brackets 38 at one end and at the other end in suitable bearings in bearing bracket 42 which extends completely across the rear of table 12. Each of the rollers has a suitable flange 48 at its inner end to limit the inward movement of the cylindrical element being coated. Each of the shafts of outside rollers 40 extend through bearing support plate 42 and has attached thereto a pulley 50. Each of the shafts of the centrally located rollers 46 also extends through the bearing support plate 42 and has attached thereto a suitable pulley 52. Midway between the two pulleys 52 and on the center line of the machine between the two impregnating stations and also below the center line of the pulleys 52 an idler pulley 54 is rotatably mounted in support plate 42. The driving motor which may be any suitable power means such as an electric motor 56 is located on a suitable support 58 beneath the table 12. The four rollers are driven by a single belt 60 which passes over a suitable pulley 62 on the motor 56 and over the pulleys 50 at each side of the machine and the pulleys 52 located near the center of the machine and beneath the pulley 54. Belt 60 which may be of the V-belt type passes below pulley 54 so that there is sufficient contact between the belt and pulleys 52 to drive them and the pulleys 50 at the same speed. The motor continuously rotates the rollers 40 and 46 at each driving station during operation of the machine. The pair of rollers at each station 14 and 16 is also parallel or in longitudinal alignment with the guide rails 32 and 36 at each impregnating station. The rails are positioned so that they will support a cylindrical object at substantially the same height as the rollers would support it. Thus, the cylindrical object can be slid from the rails onto the rollers.

The mechanism at each station 14 and 16 to slide the cylindrical object to be coated from the rails to the rollers is operated by compressed air from a suitable source under the control of the operator. Since this mechanism is the same at both stations 14 and 16, like reference numerals are used. The compressed air operates a piston in a conventional servo cylinder 64 mounted longitudinally beneath the table 12. A piston rod 66 extends from the cylinder 64. One cylinder 64 is located centrally under each of the coating stations 14 and 16. At the end of the piston rod 66 which is centrally located beneath rollers a crosshead 68 is attached thereto. The crosshead 68 extends upwardly and has a wide portion having an aperture 70 at each side which fits over a guide rod 72 extending longitudinally parallel to the rails and located below the horizontal supports 30—32. The guide rods 72 are supported at the rear of the machine in the bearing support bracket 42 and at the front of the machine in the transverse support plate 74. Above the crosshead portion 68 there is an upwardly extending portion 76 between the rails. A pusher member 78 is adjustably secured to the crosshead portion 76 by suitable screw and slot connection so that the height of the pusher member 78 can be adjusted for different diameter cylinders which are to be coated in the machine. The top of the pusher member 78 has a cylindrical body portion 80 (Fig. 2) having a central aperture 82 through which a nozzle 84 passes. The cylindrical pusher 80 has a recess in which is positioned a wiping washer 86 which is held in position by a plate 88 suitably attached to the pusher body 80. The annular rubber wiping washer 86 has a tapered edge engaging the nozzle 84 to wipe it clean of the impregnating fluid between each operation of the machine. The wide central portion of the crosshead 69 which surrounds rails 72 has a web between the rails which extends forwardly along the rail 72 for a length slightly greater than the length of the cylindrical element to be coated. At the forward end of the crosshead portion 69 there is mounted a forward pusher member 90 extending upwardly between the rollers. The forward pusher 92 is suitably secured to the pusher crosshead portion 90 by adjustable means such as a screw and slot connection so that it may be adjusted to the correct height for different diameter cylindrical elements which are to be coated. The front pusher 92 best shown in Figs. 2 and 4 has a bearing 94 mounted within a bore for a shaft 96 which supports a rotating pusher member 98. The pushing member 98 is suitably shaped to engage the end of the filter element pushed. In this case the filter element 100 which it operates upon has an outwardly flared portion 102. Thus, in this instance the pusher element 98 has a similar conical shape to engage this surface. The shaft 96 is suitably mounted for limited sliding movement in the bearing 94. This sliding movement is limited by a pin and slot connection 104 between the shaft 96 and the internal sleeve of bearing 94. A spring 106 resiliently urges the pusher member 98 outwardly toward the filter element within the limits of movement as restrained by the pin and slot connection 104. This spring 106 provides a shock-absorbing device when the pusher element 98 engages the filter element.

Figure 5:
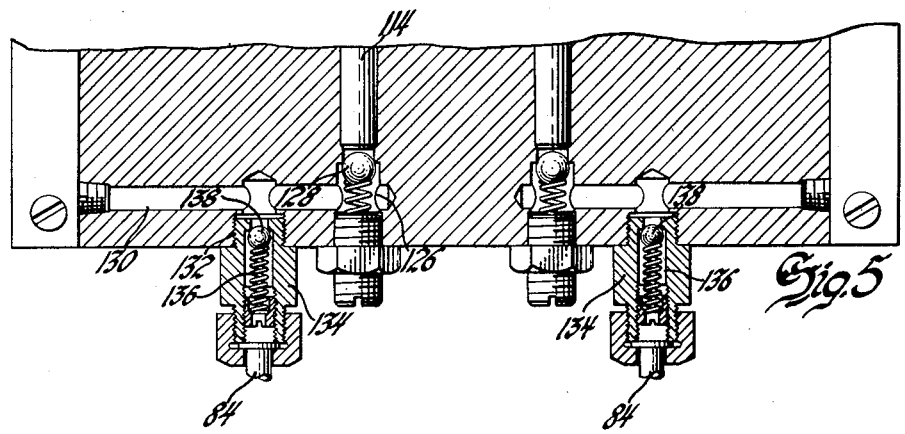
Figure 5 is a partial section along the line 5—5 of Figure 4.

The fluid supply mechanism 22 generally shown in Fig. 2 is located on the auxiliary table portion 20 and has a tank 110 containing a supply of impregnating fluid. The tank 110 is connected by a suitable passage 112 to the fluid injecting cylinder 114. A piston 116 operates in the cylinder 114 and is actuated by a suitable air cylinder 118. The air cylinder 118 has a suitable piston therein operating the piston rod 120 which is connected by a universal joint 122 to the injecting piston 116. The fluid which is injected is maintained at a constant temperature by the thermostatically controlled electric heater 124 located beneath the cylinder 114 in the tank 110. The injection cylinder 114 has its outlet 126 best shown in Fig. 5 controlled by a suitable ball check valve 128 which is spring urged to prevent return flow to the cylinder. From each injection cylinder outlet passage 126 a transverse passage 130 leads to an injector 84. A threaded aperture in the injector cylinder block connects with passage 130 and is parallel to the injector cylinder 114 but laterally displaced therefrom. An injector valve block 134 is threadably secured in the aperture 132. The valve block 134 has an axial bore 136 therein which has a check valve 138 to prevent return flow from the nozzle 84 to the injector cylinder 114. The check valve 138 may be any suitable ball type spring loaded check valve. As best shown in Figure 3, there is also a transverse passage 140 connected to the axial passage 136 in valve block 134. A compressed air line 142 is connected to the transverse passage 140 and has therein a check valve 144 suitably spring loaded to prevent flow of oil from the axial passage 136 into the air passage 142. The air passage 142 is used to inject air into the nozzle 84 to clear it of fluid. It will be seen that the check valve 138 prevents air flowing back into the injector cylinder 114. The outer end of the valve block 134 has an axial cylindrical portion 146 with a flat face 148. The fixed body portion 150 of the injector has an outwardly directed radial flange 152 at its inner end which seats against flat face 148. A nut 154 having a suitable central aperture fitting over the body portion 150 of the nozzle seats against the outer surface of the flange 152 and is threaded on the axial flange 146 to secure the flange 152 between the face 148 to fix the nozzle body 150 to the valve block 134. The nozzle body 150 has a longitudinal series of apertures 154 extending along one side thereof. A control sleeve 156 is rotatably fitted on the injector nozzle body 150 and has a longitudinal series of apertures 158 which match with the apertures 154. A plug 160 secured in the end of the valve body 150 has a shoulder 162 to secure the rotatable sleeve 156 in position. At the inner end of the sleeve 156 operating lever 164 is secured thereto. The spring 166 best shown in Fig. 4 resiilently urges the sleeve 156 to the cut-off position. The operating arm 164 is connected by intermediate arm 168 to the operating rod 170 of a solenoid actuating device 172. The solenoid device is operated by the machine operator to raise the rod 170 and thus rotate lever 164 and sleeve 156 to align the apertures 154 and 158 in conjunction with the operation of piston 118 to apply pressure to the line to inject fluid in the cylindrical member. Solenoids 172 are suitably mounted in the support bracket 176.

Though it is believed that the operation of this machine will be clear from the above description of the details of the mechanism, the apparatus may be operated in the following manner. The operator places an oil filter element on the rails 36 and 32 in the position of oil filter element 101. At this time the pusher member 92 is in the rear position illustrated at 92' and the back pusher 80 and the wiper is just beyond the tip of the nozzle 84. The operator then presses a button or operates a valve admitting air into the cylinder 64 which moves the crosshead 68 rearwardly. A pusher 92 engaging the filter element through the push piece 98 slides the filter element along the rails 32, 36 and on the rollers 44 and 46. The rollers are continuously rotating and thus the filter element immediately starts to rotate. When the filter element has reached the position illustrated by the filter element 100 where the rear edge of the filter element abuts against the flanges 48 on the rollers the solenoid 172 is operated. Solenoid 172 through the linkage mechanism 168, 164 rotates the sleeve 156 on the nozzle body 150 so that the apertures 154 and 158 are in alignment. Then the air cylinder 118 is actuated and compresses the fluid in the cylinder 114 which opens valve 120 whereby the fluid passes outwardly through passages 130 and 132 to the nozzle. This flow of fluid also opens valve 138 and maintains valve 144 in closed position. The fluid then passes out through the nozzle openings into the central portion of the filter element. When the flow of fluid stops as the piston 116 reaches the end of its stroke, air under pressure is admitted through pipe 142 and valve 144 to clear the fluid from the nozzle to inject a uniform quantity of fluid into each filter. Check valve 138 prevents flow of air to cylinder 114. Due to the rotation of the filter element at a high speed by the rollers the fluid is evenly distributed about the cylindrical filter paper.

The foregoing detailed description of the preferred embodiment of the invention is not intended to limit the invention since the inventive prnciples involved are capable of modification without departing from the spirit of the invention and the scope of the appended claims.

I claim:

1. In apparatus of the class described, a support, a pair of longitudinally extending spaced guide rails to support and guide a hollow rotatable member during longitudinal movement, a pair of rolls rotatably mounted on said support adjacent an end of said rails in longitudinal alignment therewith and positioned to receive the member from said rails and rotate and support the member, the length of said rails and said rolls being substantially the same and slightly greater than the length of said member, each of said rolls having an integral flange adjacent their inner ends to limit the longitudinal movement of said member and position said member on said rolls, means to rotate said rolls, an elongated nozzle having outlets mounted on said support and extending along and above said rolls toward said rails, a valve mechanism to close said nozzle outlets, means to supply fluid to said nozzle, means to supply air under pressure to said nozzle to clear the fluid from said nozzle, a reciprocating member mounted below said rolls, a wiper mounted on said reciprocating member and engaging said nozzle to clean said nozzle, means mounted on said reciprocating member to move said hollow member from said guide rails onto said rolls to surround said nozzle and off said rolls and away from said nozzle and onto said guide rails.

2. In apparatus of the class described, a support, a pair of longitudinally extending spaced guide rails to support and guide a hollow rotatable member during longitudinal movement, a pair of rolls rotatably mounted on said support adjacent an end of said rails in longitudinal alignment therewith and positioned to receive the member from said rails and rotate and support the member, the length of said rails and said rolls being substantially the same and slightly greater than the length of said member, each of said rolls having an integral flange adjacent their inner ends to limit the longitudinal movement of said member and position said member on said rolls, means to rotate said rolls, an elongated nozzle having an outlet mounted on said support and located parallel to and centrally above said rolls, means to supply fluid to said nozzle, a reciprocating member mounted on said support, a retraction arm mounted on said reciprocating member and extending above said rolls and positioned to engage said hollow member, a pusher arm mounted on said reciprocating member and extending above said rolls, said pusher arm and said retraction arm being spaced apart a distance slightly greater than the length of the hollow member, and means to reciprocate said reciprocating member to alternately position said hollow member from said rails and onto said rolls with said nozzle positioned in the hollow portion of said member and from said rolls to said rails.

3. In apparatus of the class described, a support, a pair of longitudinally extending spaced guide rails to support and guide a hollow rotatable member during longitudinal movement, a pair of rolls rotatably mounted on said support adjacent an end of said rails in longitudinal alignment therewith and positioned to receive the member from said rails and rotate and support the member, the length of said rails and said rolls being substantially the same and slightly greater than the length of said member, each of said rolls having an integral flange adjacent their inner ends to limit the longitudinal movement of said member and position said member on said rolls, means to rotate said rolls, an elongated nozzle having an outlet mounted on said support and located parallel to and centrally above said rolls, a valve mechanism to close said nozzle outlets, means to supply a measured quantity of fluid to said nozzle, means to supply air under pressure to said nozzle to clear the fluid in said nozzle, a reciprocating member mounted below said rolls, an arm mounted on the rear part of said reciprocating member and extending upwardly between said rolls and having an annular wiper surrounding said nozzle to clean said nozzle, a pusher arm mounted on the forward part of said reciprocating member and extending upwardly between said rolls, a pusher element rotatably and longitudinally movably mounted on said pusher arm, a spring positioned between said pusher element and arm to resiliently mount said pusher element on said pusher arm, said pusher element and said wiper being spaced apart a distance slightly greater than the length of the hollow member, and means to reciprocate said reciprocating member to alternately position said wiper at the rear end of the rolls on said nozzle and at the rear end of said guide rails off said nozzle and to position said pusher element at the front end of the rolls and at the front end of said guide rails.

References Cited in the file of this patent

UNITED STATES PATENTS

| | | |
|---|---|---|
| 1,850,481 | Telfer | Mar. 22, 1932 |
| 2,254,336 | Von Sydow et al. | Sept. 2, 1941 |
| 2,348,714 | Defiore | May 16, 1944 |
| 2,383,023 | Sykes | Aug. 21, 1945 |
| 2,431,658 | Demb et al. | Nov. 25, 1947 |
| 2,470,958 | Stromquist | May 24, 1949 |